(12) United States Patent
Abdolkhani (10) Patent No.: US 10,840,744 B2
(45) Date of Patent: Nov. 17, 2020

(54) INDUCTIVE POWER TRANSMITTER

(71) Applicant: Apple Inc., Cupertino, CA (US)

(72) Inventor: Ali Abdolkhani, Auckland (NZ)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 15/554,938

(22) PCT Filed: Mar. 4, 2016

(86) PCT No.: PCT/NZ2016/050034
§ 371 (c)(1),
(2) Date: Aug. 31, 2017

(87) PCT Pub. No.: WO2016/140582
PCT Pub. Date: Sep. 9, 2016

(65) Prior Publication Data
US 2018/0034326 A1 Feb. 1, 2018

Related U.S. Application Data

(60) Provisional application No. 62/128,263, filed on Mar. 4, 2015.

(51) Int. Cl.
*H02J 50/60* (2016.01)
*H02J 50/10* (2016.01)
(Continued)

(52) U.S. Cl.
CPC ........ *H02J 50/60* (2016.02); *G06K 19/07758* (2013.01); *H02J 7/025* (2013.01);
(Continued)

(58) Field of Classification Search
CPC ....... B60L 11/00; B60L 11/182; G06K 19/00; G06K 19/07758; H02J 17/00; H02J 7/00;
(Continued)

(56) References Cited

U.S. PATENT DOCUMENTS 4,960,983 A  10/1990 Inoue
5,850,135 A  12/1998 Kuki
(Continued)

FOREIGN PATENT DOCUMENTS

CN  1954472 A  4/2007
CN  101375483 A  2/2009
(Continued)

OTHER PUBLICATIONS

International Search Report for International Application No. PCT/NZ2016/050034 dated Jun. 10, 2016 (3 pages).
(Continued)

*Primary Examiner* — Lincoln D Donovan
*Assistant Examiner* — Dave Mattison
(74) *Attorney, Agent, or Firm* — Blank Rome LLP (57) ABSTRACT

An inductive power transmitter comprising: at least one power transmitting coil configured to generate an inductive power transfer (IPT) field; and an object detection system configured to detect objects in or adjacent a space occupied by the IPT field when generated; wherein the object detection system is configured to detect a receiver object based on a tag associated with the receiver object.

10 Claims, 8 Drawing Sheets

(51) Int. Cl.
- *H02J 50/12* (2016.01)
- *G06K 19/077* (2006.01)
- *H02J 7/02* (2016.01)
- *H02J 50/90* (2016.01)
- *H02J 50/40* (2016.01)
- *H01F 7/02* (2006.01)

(52) U.S. Cl.
CPC ............ *H02J 50/10* (2016.02); *H02J 50/12* (2016.02); *H01F 7/02* (2013.01); *H02J 50/40* (2016.02); *H02J 50/90* (2016.02)

(58) Field of Classification Search
CPC .... H02J 7/025; H02J 5/00; H02J 5/005; H02J 50/00; H02J 50/10; H02J 50/12; H02J 50/40; H02J 50/60; H02J 50/90; H01F 38/00; H01F 38/14; H01F 7/00; H01F 7/02
USPC .......................................................... 307/104
See application file for complete search history.

(56) References Cited

U.S. PATENT DOCUMENTS

| | | | |
|---|---|---|---|
| 6,157,162 A | 12/2000 | Hayashi | |
| 6,219,267 B1 | 4/2001 | Andres | |
| 9,735,626 B2 | 8/2017 | Hyodo | |
| 2003/0214821 A1 | 11/2003 | Giannopoulos | |
| 2005/0068019 A1 | 3/2005 | Nakamara et al. | |
| 2005/0069019 A1 | 3/2005 | Kaizuka | |
| 2005/0116683 A1 | 6/2005 | Cheng | |
| 2006/0202665 A1 | 9/2006 | Hsu | |
| 2007/0131505 A1 | 6/2007 | Kim | |
| 2007/0182367 A1 | 8/2007 | Partovi | |
| 2007/0228833 A1 | 10/2007 | Stevens et al. | |
| 2008/0014867 A1 | 1/2008 | Finn | |
| 2008/0211458 A1 | 9/2008 | Lawther et al. | |
| 2009/0001932 A1 | 1/2009 | Kamijo | |
| 2009/0033280 A1 | 2/2009 | Choi | |
| 2009/0174264 A1 | 7/2009 | Onishi et al. | |
| 2009/0203345 A1 | 8/2009 | Sorrells | |
| 2010/0135634 A1 | 6/2010 | Ito | |
| 2010/0157154 A1 | 6/2010 | Kobayashi | |
| 2010/0190436 A1 | 7/2010 | Cook | |
| 2010/0328044 A1* | 12/2010 | Waffenschmidt | H02J 7/025 340/10.4 |
| 2011/0049997 A1 | 3/2011 | Urano | |
| 2011/0089768 A1 | 4/2011 | Byrne et al. | |
| 2011/0128015 A1 | 6/2011 | Dorairaj | |
| 2011/0128714 A1 | 6/2011 | Terao | |
| 2011/0196544 A1 | 8/2011 | Baarman et al. | |
| 2013/0030892 A1 | 1/2013 | Liu et al. | |
| 2013/0062959 A1 | 3/2013 | Lee | |
| 2013/0094598 A1 | 4/2013 | Bastami | |
| 2013/0097078 A1 | 4/2013 | Wong | |
| 2013/0119773 A1 | 5/2013 | Davis | |
| 2013/0127259 A1 | 5/2013 | Lohr | |
| 2013/0221913 A1 | 8/2013 | Kim | |
| 2013/0257168 A1 | 10/2013 | Singh | |
| 2013/0263596 A1 | 10/2013 | Arisawa | |
| 2014/0015329 A1 | 1/2014 | Widmer et al. | |
| 2014/0084857 A1 | 3/2014 | Liu | |
| 2014/0009178 A1 | 4/2014 | Hyodo | |
| 2014/0091634 A1 | 4/2014 | Mayo et al. | |
| 2014/0091755 A1 | 4/2014 | Walley et al. | |
| 2014/0111154 A1 | 4/2014 | Roy | |
| 2014/0191715 A1 | 7/2014 | Wechlin | |
| 2014/0197687 A1 | 7/2014 | Lin | |
| 2015/0015597 A1 | 1/2015 | Sano | |
| 2015/0054355 A1 | 2/2015 | Ben-Shalom | |
| 2015/0070094 A1 | 3/2015 | Pham | |
| 2015/0077050 A1* | 3/2015 | Van Funderburk | H02J 5/005 320/108 |
| 2015/0162785 A1 | 6/2015 | Lee | |
| 2015/0178532 A1 | 6/2015 | Brulé | |
| 2015/0180264 A1 | 6/2015 | McFarthing | |
| 2015/0182086 A1 | 7/2015 | Dimbylow | |
| 2015/0244176 A1 | 8/2015 | Van Den Brink | |
| 2015/0270719 A1 | 9/2015 | Kurs | |
| 2015/0285926 A1 | 10/2015 | Oettinger | |
| 2015/0321567 A1 | 11/2015 | Czainski | |
| 2016/0087687 A1 | 3/2016 | Kesler | |
| 2016/0142174 A1 | 5/2016 | Fine | |
| 2016/0329755 A1 | 11/2016 | Park | |
| 2017/0117756 A1 | 4/2017 | Muratov | |
| 2017/0237296 A1 | 8/2017 | Keith | |
| 2017/0334602 A1 | 11/2017 | Church | |
| 2018/0034326 A1 | 2/2018 | Abdolkhani | |
| 2018/0146344 A1 | 5/2018 | Kwon | |
| 2020/0099417 A1 | 3/2020 | Park | |

FOREIGN PATENT DOCUMENTS

| | | |
|---|---|---|
| CN | 103782485 A | 5/2014 |
| EP | 2017940 A2 | 1/2009 |
| EP | 2602908 A1 | 6/2013 |
| EP | 3127215 A1 | 2/2017 |
| JP | H01157896 A | 6/1989 |
| JP | 2003263668 A | 9/2003 |
| JP | 2005345435 A | 12/2005 |
| JP | 2009038685 A | 2/2009 |
| JP | 2009058692 A | 3/2009 |
| JP | 2009089209 A | 4/2009 |
| JP | 2009112137 A | 5/2009 |
| JP | 2009118587 A | 5/2009 |
| JP | 2010508007 A | 3/2010 |
| JP | 2010118881 A | 5/2010 |
| JP | 2010239690 A | 10/2010 |
| JP | 2010538596 A | 12/2010 |
| JP | 2011193671 A | 9/2011 |
| JP | 2012504387 T | 2/2012 |
| JP | 2012065472 A | 3/2012 |
| JP | 2012175793 A | 9/2012 |
| JP | 2012533277 A | 12/2012 |
| JP | 2013542424 A | 11/2013 |
| JP | 2014027102 A | 2/2014 |
| JP | 2014057235 A | 3/2014 |
| JP | 2014507922 T | 3/2014 |
| JP | 2014075858 A | 4/2014 |
| JP | 2014126512 A | 7/2014 |
| JP | 2014155376 A | 8/2014 |
| JP | 2014526871 A | 10/2014 |
| JP | 2014222994 A | 11/2014 |
| JP | 2015008554 A | 1/2015 |
| JP | 2015019283 A | 1/2015 |
| JP | 2015027172 A | 2/2015 |
| JP | 2015046990 A | 3/2015 |
| JP | 2015136281 A | 7/2015 |
| JP | 2017511111 T | 4/2017 |
| JP | 2018503063 T | 2/2018 |
| KR | 10-20080094953 A | 10/2008 |
| WO | 8910030 A1 | 10/1989 |
| WO | 2005101304 A1 | 10/2005 |
| WO | 2005109598 A1 | 11/2005 |
| WO | 2007125697 A1 | 11/2007 |
| WO | 2008/137996 A1 | 11/2008 |
| WO | 2008137996 A1 | 11/2008 |
| WO | 2009027674 A1 | 3/2009 |
| WO | 2009041058 A1 | 4/2009 |
| WO | 2013122483 A1 | 8/2013 |
| WO | 2013164831 A1 | 11/2013 |
| WO | 2013179394 A | 12/2013 |
| WO | 2014011776 A2 | 1/2014 |
| WO | 2014060871 A1 | 4/2014 |
| WO | 2014083015 A1 | 6/2014 |
| WO | 2014095722 | 6/2014 |
| WO | 2014095722 A2 | 6/2014 |
| WO | 2015005025 A1 | 1/2015 |

(56) References Cited

FOREIGN PATENT DOCUMENTS

| | | |
|---|---|---|
| WO | 2015008462 A1 | 1/2015 |
| WO | 2015119458 A1 | 8/2015 |

OTHER PUBLICATIONS

International Written Opinion for International Application No. PCT/NZ2016/050034 dated Jun. 10, 2016 (3 pages).
https://en.wikipedia.org/w/index.php?title=Reed_switch&oldid=615523605 retrieved Aug. 31, 2017 (5 pages).
https://en.wikipedia.org/w/index.php?title=Hall_effect_sensor&oldid=642154451 retrieved Aug. 31, 2017 (5 pages).

\* cited by examiner

INDUCTIVE POWER TRANSMITTER

This application is a National Stage Application of PCT/NZ2016/050034, filed 4 Mar. 2016, which claims benefit of U.S. Ser. No. 62/128,263, filed 4 Mar. 2015, and which applications are incorporated herein by reference. To the extent appropriate, a claim of priority is made to each of the above disclosed applications.

FIELD

This invention relates generally to an inductive power transmitter, particularly, but not exclusively, for an inductive power transfer system.

BACKGROUND

IPT systems are a well-known area of established technology (for example, wireless charging of electric toothbrushes) and developing technology (for example, wireless charging of handheld devices on a 'charging mat'). Typically, a power transmitter generates a time-varying magnetic field from a transmitting coil or coils. This magnetic field induces an alternating current in a suitable receiving coil in a power receiver that can then be used to charge a battery, or power a device or other load.

Regarding IPT systems for wireless charging of handheld devices in particular it is important that the wireless power is transferred to the receiver device only and not to so-called foreign objects, which can be defined as any object that is positioned on the charging mat (e.g., interface surface), but is not part of a receiver device. Typical examples of such foreign objects are parasitic elements containing metals such as coins, keys, paperclips, etc. For example if a parasitic metal is close to the active IPT area it could heat up during power transfer due to eddy currents that result from the oscillating magnetic field. In order to prevent the temperature of such parasitic metal from rising to unacceptable levels, the power transmitter should be able to discriminate between power receivers and foreign objects and timely abort the power transfer.

A conventional manner of detecting heating of foreign objects on an interface surface uses a power loss method. In this method the received power $P_{PR}$ is used to indicate the total amount of power that is dissipated within the power receiver contained in the handheld device due to the magnetic field produced by the power transmitter. The received power equals the power that is available from the output of the power receiver plus any power that is lost in producing that output power. The power receiver communicates its $P_{PR}$ to the power transmitter so that the power transmitter can determine whether the power loss is within acceptable set limits, and if not, the power transmitter determines anomalous behaviour which may indicate presence of a foreign object and aborts power transmission. However, this power loss accounting method does not in itself provide actual detection of a foreign object, only the occurrence of non-expected behaviour.

International patent publication number WO2014/095722, by contrast, proposes a method of foreign object detection which uses excitation and detection coils within the transmitter, separate from the primary IPT transmitter coil(s). In that case either changes in the output voltage in the detection winding, or changes in the inductance of the detection winding are used to determine possible presence of an object. However this system requires a complex calibration to determine the base inductance. It is also insensitive to metal objects versus ferrous or magnetic objects, and therefore does not provide a means to discriminate between foreign objects and friendly objects, e.g., a receiver device which typically include ferrite for magnetic flux control. Any undesirable effects of operation of the primary IPT field on the detection is also not considered or characterised, such that the proposed method may be unreliable.

Existing methods may also need to continuously monitor for the presence of anything that is placed on the charging pad. This may increase power consumption of the system and adds complexity to the processing needed.

It is an object of the invention to provide the public with a useful choice.

SUMMARY

According to one example embodiment there is provided an inductive power transmitter comprising:
  at least one power transmitting coil configured to generate an inductive power transfer (IPT) field; and
  an object detection system configured to detect objects in or adjacent a space occupied by the IPT field when generated;
  wherein the object detection system is configured to detect a receiver object based on a tag associated with the receiver object.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION

Figure 1:
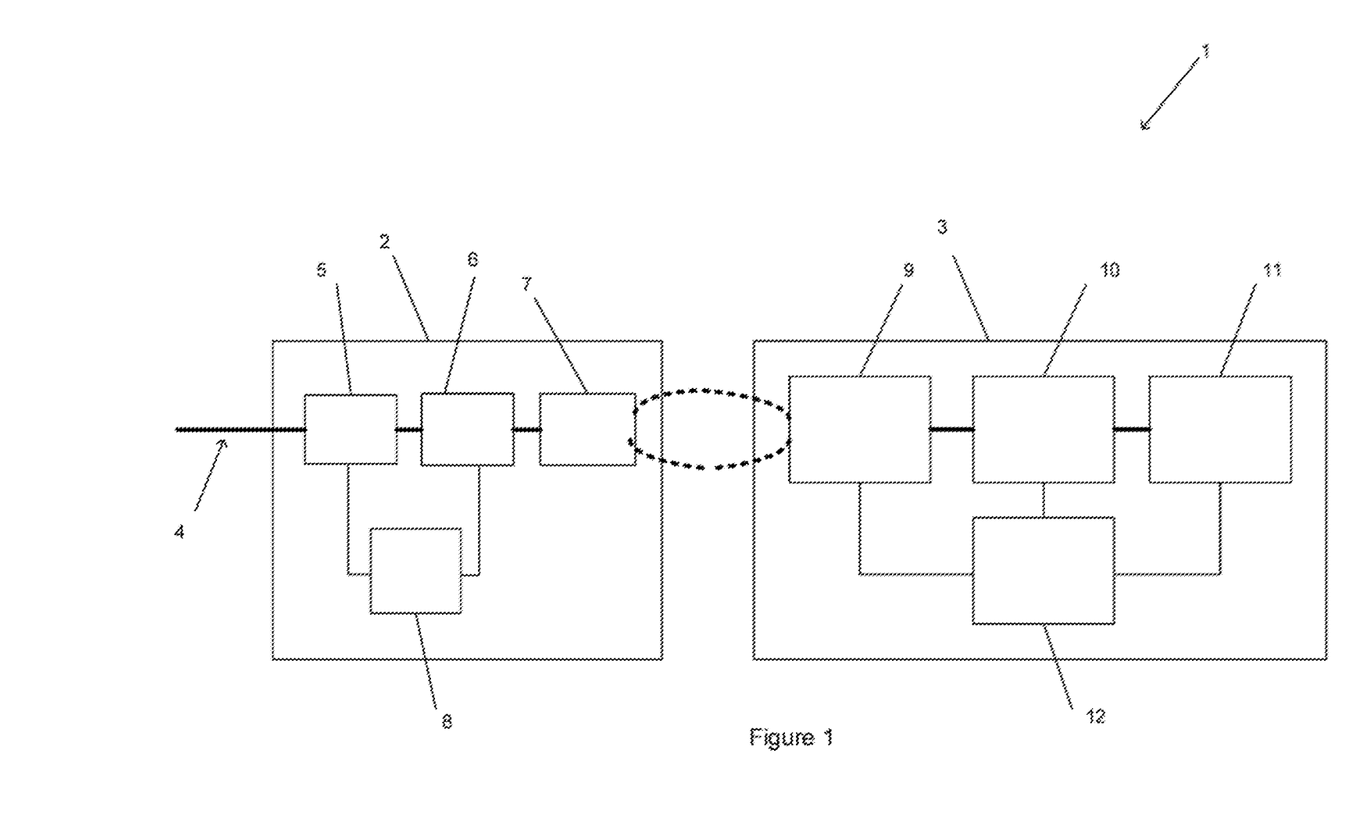
FIG. 1 is a schematic diagram of an inductive power transfer system.

An inductive power transfer (IPT) system 1 is shown generally in FIG. 1. The IPT system includes an inductive power transmitter 2 and an inductive power receiver 3. The inductive power transmitter 2 is connected to an appropriate power supply 4 (such as mains power or a battery). The inductive power transmitter 2 may include transmitter circuitry having one or more of a converter 5, e.g., an AC-DC converter (depending on the type of power supply used) and an inverter 6, e.g., connected to the converter 5 (if present). The inverter 6 supplies a transmitting coil or coils 7 with an AC signal so that the transmitting coil or coils 7 generate an alternating magnetic field. In some configurations, the transmitting coil(s) 7 may also be considered to be separate from the inverter 5. The transmitting coil or coils 7 may be connected to capacitors (not shown) either in parallel or series to create a resonant circuit.

A controller 8 may be connected to each part of the inductive power transmitter 2. The controller 8 to receives inputs from each part of the inductive power transmitter 2 and produces outputs that control the operation of each part. The controller 8 may be implemented as a single unit or separate units, configured to control various aspects of the inductive power transmitter 2 depending on its capabilities, including for example: power flow, tuning, selectively energising transmitting coils, inductive power receiver detection and/or communications.

The inductive power receiver 3 includes a receiving coil or coils 9 connected to receiver circuitry which may include power conditioning circuitry 10 that in turn supplies power to a load 11. When the coils of the inductive power transmitter 2 and the inductive power receiver 3 are suitably coupled, the alternating magnetic field generated by the transmitting coil or coils 7 induces an alternating current in the receiving coil or coils 9. The power conditioning circuitry 10 is configured to convert the induced current into a form that is appropriate for the load 11, and may include for example a power rectifier, a power regulation circuit, or a combination of both. The receiving coil or coils 9 may be connected to capacitors (not shown) either in parallel or series to create a resonant circuit. In some inductive power receivers, the receiver may include a controller 12 which may control tuning of the receiving coil or coils 9, operation of the power conditioning circuitry 10 and/or communications.

The term "coil" may include an electrically conductive structure where an electrical current generates a magnetic field. For example inductive "coils" may be electrically conductive wire in three dimensional shapes or two dimensional planar shapes, electrically conductive material fabricated using printed circuit board (PCB) techniques into three dimensional shapes over plural PCB 'layers', and other coil-like shapes. The use of the term "coil", in either singular or plural, is not meant to be restrictive in this sense. Other configurations may be used depending on the application.

It may be desirable in certain applications for the IPT transmitter to selectively provide power to associated receiver devices (e.g., mobile phones, remote controls, etc.) and not to foreign objects (e.g., paperclips, coins, etc.). To this end, the IPT transmitter may include an Object Detection (OD) system. The OD system may detect receiver devices that are in proximity to the transmitter and activate, or cause to be activated, a transmitting coil only when there is an adjacent receiver device. In situations where there is a plurality of transmitting coils, such as an array of coils (e.g., on a charging mat), the OD system may only activate, or cause to be activated, the subset of coil/s which are adjacent to one or more receiver devices.

Receiver devices may include "receiver tags". The receiver tags may include one or more unique properties or characteristics which are detectable by the OD system and are not generally present in foreign objects. The OD system may include one or more object detectors or sensors which detect the presence and/or proximity of receiver tags (or more precisely, they detect certain properties or characteristics of the receiver tags) through interaction with the tags. These sensors may be provided as part of the OD system as specialised elements or the transmitter circuitry itself may be used as these sensors. Similarly, the controller of the transmitter may form part or all of the OD system. In this way, the receiver tags act as identification elements which enable a power transmitter to identify when a power receiver is in proximity of the power transmitter, more particularly, when the receiver tags, and therefore receiver device, is within the space that an IPT field generated by one or more of the transmitter coils will occupy when the transmitter coils are operated. As explained in detail later, these identification elements can be configured so that just the presence of a receiver device can be sensed or so that the type of receiver device present can be ascertained, which can assist in the power transmitter enacting modes of power transfer specific to different receiver types, such as, for example, may be the case in a multi-mode IPT system.

The sensors of the OD system may be connected to one or more transmitting coils of the charging mat. When foreign objects that may be otherwise be energised by the magnetic flux produced by the power transmitter (e.g. metal objects such as paper clips, coins, etc.) are placed on the transmitter, the transmitting coil or coils of the charging mat will not be activated as such foreign objects lack "receiver tags". Conversely, when receiver devices are placed on the charging mat, the OD system detects the nearby receiver tags of the receiver objects, and activates, or causes to be activated, the transmitting coil or coils of the charging mat either on that basis or in conjunction with other condition settings.

Figure 2:
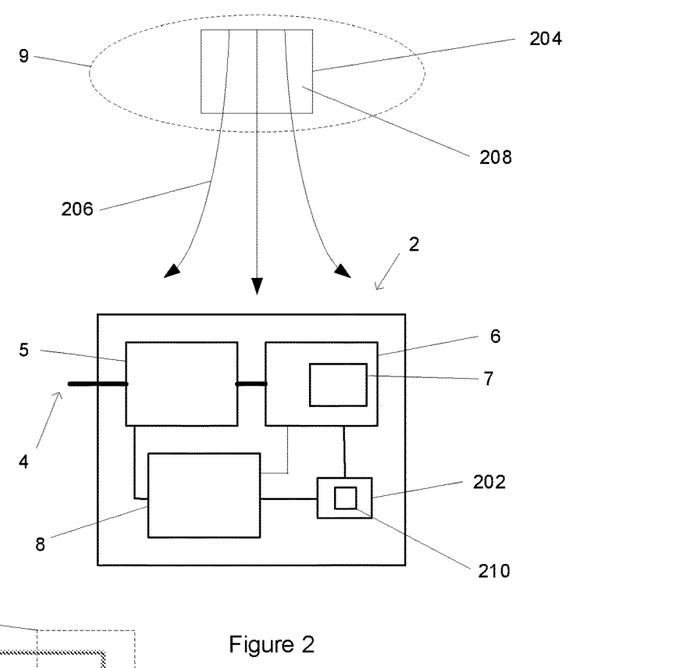
FIG. 2 is a schematic diagram of an inductive power transmitter and adjacent receiving coil.

FIG. 2 shows an example of an OD system detecting an adjacent receiver object. The transmitting coil(s) 7 is associated with an object detection (OD) system or element 202 of the power transmitter 2 which is configured to detect objects in or adjacent to the IPT field.

The receiving coil 9 is associated with or adjacent to a receiver tag or element 204. The receiving coil 9 may be part of any suitable receiver, such as a mobile phone, remote control, tablet, etc. The receiver tag 204 may include one or more unique properties or characteristics which are detectable by the OD system 202 and are not generally present in foreign objects.

Non-limiting examples of receiver tags and corresponding OD systems include:

- A receiver tag including a permanent magnet and an OD system including magnetic sensors configured to respond to the permanent magnet and not necessarily to other magnets.
- A receiver tag including a non-permanent magnet, e.g., an electromagnet, and an OD system or transmitter control which causes the non-permanent magnet to be activated when the receiver tag is brought into proximity of the transmitter, for example, through some communicated signal from the transmitter to the receiver, e.g., a modulated IPT signal, or through receipt of magnetic flux from the IPT coil(s) of the transmitter or other magnet of the OD system, for example. This may be implemented using the receiver coil energised with a DC voltage. Once the receiver has been identified using this, the receiver coil is de-energised so that it can begin receiving power, and the OD system 202 stays in the receiver identified mode until a disconnect is determined. The receiver disconnect may be determined by measuring power transfer, a time period or other communication channels.

A receiver tag including a coded reflective surface 208 and an OD system including photodetectors 210 configured to measure reflected light patterns.

As mentioned earlier, the characteristics of the receiver tag can be configured so that the type of receiver device, as well as the presence, can be ascertained by the OD system. For example, the magnetic material of the permanent or non-permanent magnet of the above examples can be configured so that a unique magnetic flux (e.g., of a certain strength, quality or other characteristic) is induced in the OD system sensors or the reflective surface of the other example is uniquely coded based on the receiver type. For example, different receiver types may be those that require different power levels for effective powering/charging of the receiver-side load, that rely on protocols of a particular industry standard or different versions of an industry standard, or are different devices, e.g., a cellular phone, wearable device, etc. In such case, the OD system may be provided with sensor(s) or control that is able to discern between these different characteristics, or with individual sensors for individual receiver types.

Figure 6:
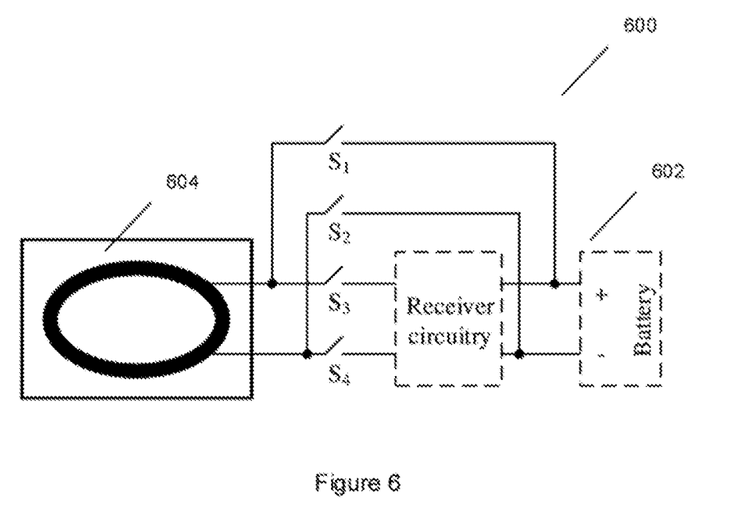
FIG. 6 is a circuit diagram of a receiver circuit where the receiver coil is used to generate a magnet.

FIG. 6 shows an example of the circuit 600 that could be used to implement the receiver coil based "magnet". The available DC power in the battery 602 of the device can be used to drive the Rx coil 604 and generate static magnetic field to activate the sensor. The required static flux density to activate the sensor can be deliberately chosen as very low (~few milli Tesla), to minimise the amount of DC power required to generate the magnet.

In FIG. 6, when the battery is used to provide static magnetic field (electromagnet) the switches $S_1$, $S_2$ are closed and the switches $S_3$ and $S_4$ are open to isolate the coil from the receiver circuitry. It may operate in the electromagnetic mode intermittently or when a user manually selects wireless charge mode. Likewise when the Rx coil 604 is in its receiving power mode, the switches $S_3$ and $S_4$ are closed and the upper switches $S_1$ and $S_2$ are open. This may have the advantage that it saves the spaces and cost of including a magnet and any interference caused or shielding required as a result.

Returning to FIG. 2, the receiving coil 9 of the receiver device is illustrated as having a receiver tag 204 which contains or consists of a permanent magnet. The receiver tag 204 is substantially located in the centre of the receiving coil 9. Alternatively, if the receiver coil does not have space within for the placement of the receiver tag, e.g., due to the receiver coil being a fully wound spiral or having ferrite material located within the coil, or otherwise, the receiver tag 204 may be located outside of the receiving coil 9 in a relative location that still enables detection. Alternatively, a plurality of tags could be provided located within or without of the receiver coil (or coils if multiple coils are present in the receiver) or a combination of both of these locations. The tag(s) may be positioned in the plane of the receiver coil or in a different plane, or may project out of the plane dependent on the relative dimensions of the tag and coil.

Being a permanent magnet, the receiver tag 204 has a magnetic field 206. The magnetic field of the permanent magnet of the receiver tag may adapted according to the requirements of the OD system 202 and the application. For example, the density of magnetic material of the permanent magnet can be selected to provide a magnetic field of a certain strength or volume.

In order to not cause significant coupling with the IPT coils of the power transmitter, which could otherwise effect the wireless power transfer, the magnetic field of the associated magnet 204 is lower than the magnetic field of the transmitting coil(s) 7. For example it may be at least 100 times lower. Alternatively, in embodiments of the OD system in which the receiver tag is a non-permanent magnet, the IPT coil(s) of the power transmitter can be used as at least part of the object sensor if the non-permanent magnet is temporarily activated to provide identification, in which case the magnetic field strength of the non-permanent magnetic is sufficient to cause coupling with the transmitter coil(s).

The OD system 202 of the transmitter 2 may include one or more magnetic switches, sensors or relays which detect the magnetic flux 206 caused therein by the magnetic field 206 of the receiver tag 204.

In the example of FIG. 2, the OD system 202 is illustrated as a separate component connected to the controller 8 of the transmitter 2, accordingly when the OD system 202 detects a receiver tag, it causes the controller 8 to activate the inverter 6, thereby supplying power to the transmitting coil(s) 7. Alternatively, the OD system may be an integral part of the controller 8. In either case, the OD system 202 may include any suitable switch, sensor or relay which is responsive to receipt of magnetic flux. In some embodiments, this may be a magnetic switch, such as a Hall Effect switch, a Reed switch or a combination of these or other types. Magnetic switches may be normally open (closing when a magnetic field is present), or normally closed (opening when a magnetic field is present). Selection of the type of detection mechanism of the OD system may be governed by many factors, but in the case of a typical wireless power transfer system it is desirable that the OD system, and therefore the sensor mechanism, is able to withstand a wide range of operating temperatures (e.g., about −40 degrees Celsius to about 150 degrees Celsius). Like the receiver tag 204, the OD system sensor may be located within or without the respective transmitting coil 7. It may be beneficial, for example, to have the OD sensor located within the transmitter coil (considering that the transmitter coil is not a fully wound spiral or has ferrite material therein preventing such placement) if the receiver tag is within the associated receiver coil, or if the receiver tag is offset, to have the OD sensor correspondingly offset from the transmitter coil. This relative placement of the tag and sensors depends on the actual configuration of the IPT system and the need or otherwise to have the transmitter and receiver coils aligned for power transfer. Further, multiple sensors may be used for the or each transmitter coil, which may be arranged within or without of the coils, or in a combination of these relative positions, to provide detection independent of the receiver devices position relative to the transmitter.

The OD system will advantageously be activated only by the permanent or non-permanent magnet of the receiver tag 204, and not by non-magnetic metal objects. Further, the OD system may be highly tuned such that it is activated by only certain magnetic flux strengths, ensuring that it selectively detects a receiver object with a corresponding associated magnet rather than just any magnet. However a high degree of tuning may cause non-detection in certain circumstances. In a given application a particular distance between the magnet and the magnetic switch would be identified according to design considerations at which the switch changes state. For example the transmitter and receiver coils should be significantly coupled before being energised, but equally perfect alignment may not be desired or necessary. The distance may be in terms of z height, in terms of x/y distance or a combination, and may be adjusted by selecting the sensitivity of the switch and/or the strength of the magnet.

On the other hand, if the OD system is not tuned it may disadvantageously be activated by a foreign permanent magnet which is not part of the receiver. Nonetheless, if a transmitter is activated by a foreign magnet, this is under no load conditions, so minimum power is wasted. Further, under no load conditions, a magnet on an operating transmitter does not heat up as may occur with foreign metal objects on an operating transmitter. Thus the consequence associated with foreign magnets may be negligible. Further, in IPT systems where communications between the transmitter and receivers are used to establish and maintain so-called 'power contracts' actual power transfer would only occur when an actual receiver is present. In other words if a foreign magnet activated the transmitter, the transmitter tries to communicate with the object/device that caused this activation. If the object is a foreign magnet it would not respond, then in that case the transmitter terminates charging.

It is possible that a transmitting coil may be activated by a receiver even if a metal object is positioned between the receiver and the transmitter, a so-called 'intervening' or 'overlapping' foreign object. This may result in heating of the metal foreign object causing a reduction of power transfer efficiency through losses into the parasitic foreign object and possible safety issues. Possible solutions to this include a correlation method in which the voltage or current waveforms of the sensor when it is activated by a magnet alone are compared to those for a magnet+a metal object. It has been observed that the response of the sensor when it is activated by only a magnet is different from the case when activated by a magnet+a metal object. Such information can be modelled and programmed into the OD system or transmitter controller through hardware, firmware or software means, e.g., as a lookup table in memory associated with controller or OD system, with the controller or OD system configured to enable measurement of the detection waveforms or signals. The actual waveforms measured in operation are then correlated to one of the example/known waveforms to distinguish such non-powering events. Other solutions may include combining the permanent magnet option with other FOD method (i.e. such as power loss accounting, etc.) to overcome the overlapping FO/receiver scenario.

Figure 7:
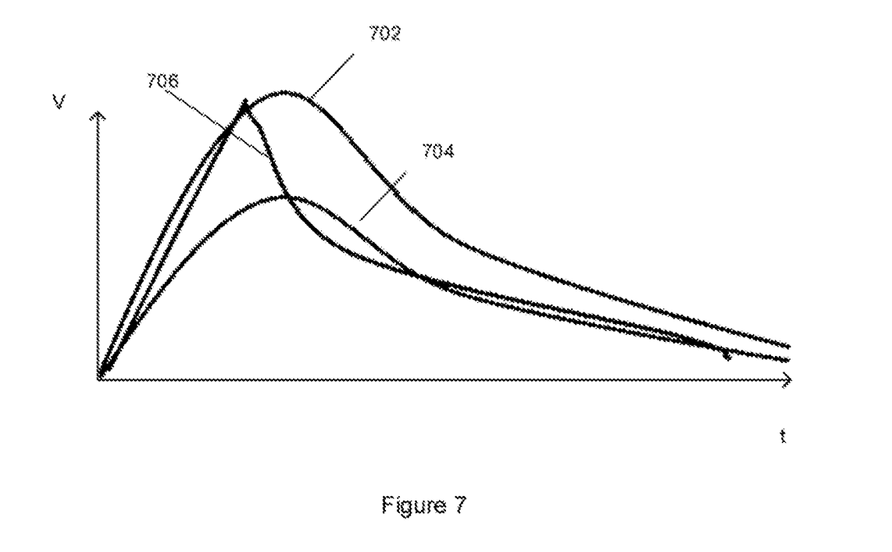
FIG. 7 is a graph of circuit waveforms used to correlate the presence of foreign magnets.

For example, when monitoring the voltage and/or current of the sensor, when a magnet from a receiver is placed on the transmitter, a characteristic $V_s$ or $I_s$ verses time waveform is observed as shown in FIG. 7. An Rx with a valid magnet is placed on the Tx, with the first waveform 702 for an Rx magnet aligned with the Tx sensor and the second waveform 704 with the Rx magnet offset. The second waveform 704 is the same characteristic shape as the first waveform 702, but with a lower amplitude due to the Rx magnet being further from the Tx sensor. The third waveform 706 with a foreign object such as a coin present is distorted or has a different shape compared to the waveforms 702 and 704 without a foreign object. This different shape can be detected by correlating the detected shape with a reference waveform shape (702 or 704), and is a sufficiently different the presence of a foreign objection can be declared and the power delivery prevented or interrupted. The reference waveform shape may be determined experimentally and included in a lookup table of the Tx for example. Various statistical methods may be used to correlate the shape of a detected waveform (702, 704, 706) with the reference waveform, and if a difference above a predetermined threshold is calculated then the presence of a foreign object is declared to the power transfer control process.

An example statistical method for correlating a detected waveform with a reference waveform is cross-correlation. By normalising the detected waveform average amplitude then applying a cross-correlation function, the shapes of the two waveforms can be compared. The cross correlation of two discrete sequences x[n] and y[n] could be represented mathematically as shown in Equation (1).

$$R_{xy}[l] = \sum_{n=-\infty}^{\infty} x[n] \times y[n-l] \text{ where} \quad (1)$$

$$l = 0, \pm 1, \pm 2, \pm 3, \ldots$$

For example a reference (normalised) voltage or the current waveform of the sensor when it is activated by an Rx only waveform (say one of 702 or 704 shown in FIG. 7) is represented by the discrete sequence x[n]. And y[n] represents the detected waveform when the sensor is activated by the Rx and a metal object placed in between (706).

The sequence x[n] (the reference voltage/current of the sensor activation by Rx only) is cross-correlated with the normalised voltage/current of the sensor y[n]. when a metal is placed in between. This will result in a cross-correlation product Rxy[l] below a threshold, indicating the presence of a foreign object. On the other hand, when a waveform is detected without a foreign object, the normalised cross-correlation product will be above the threshold and therefore indicate the presence of an Rx only. The skilled person will appreciate that other statistical or pattern recognition methods could alternatively be used.

It has also been observed using a digital Hall Effect sensor that the placement of an Rx with metal foreign object causes a measurable distortion of the normal output response of such a sensor when a minimum magnetic field strength is detected. In this implementation no normalisation is required and only a cross-correlation calculation is required. Again, a cross-correlation above a threshold indicates the presence of an Rx only, whereas below the threshold indicates the presence of an Rx and metal foreign object.

Figure 3:
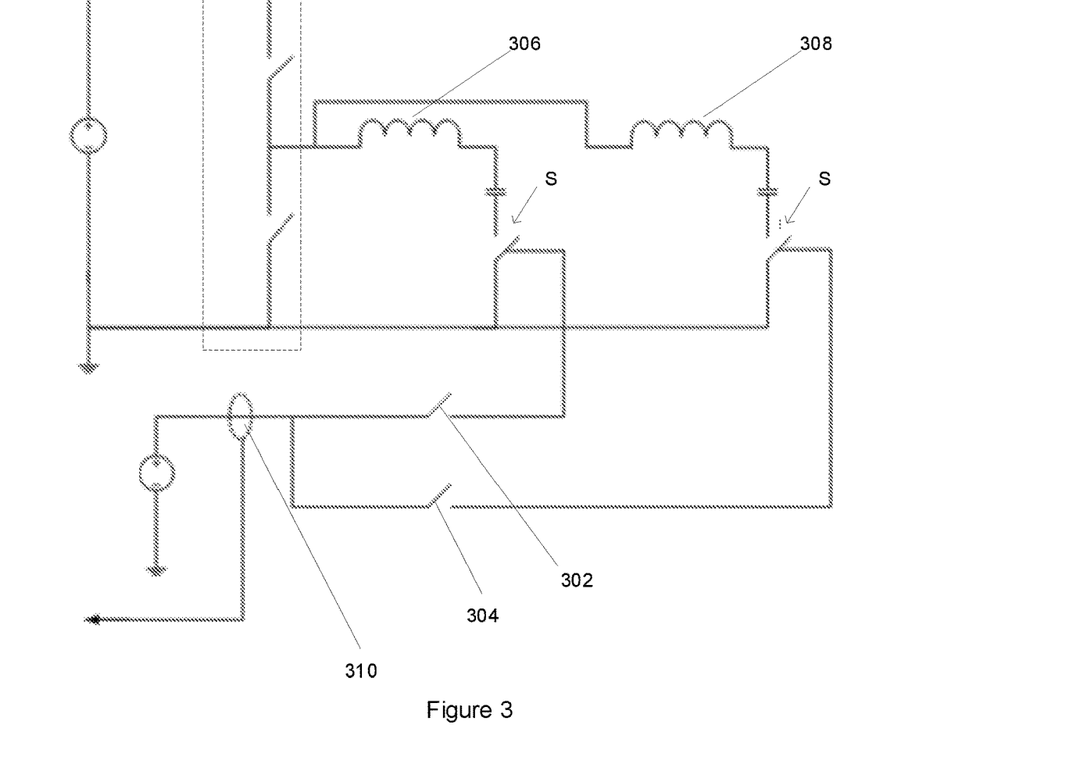
FIG. 3 is a circuit diagram of an inverter and an object detection system.

FIG. 3 shows an example implementation of the inverter 5 and object detection system. The OD system includes two Hall-Effect switches 302 and 304, each connected to a transmitting coil (306 and 308 respectively) via associated power switches S of the transmitting coil circuits and connected to the inverter 5 through junction 310, thereby providing closed loop control. The power switches S are used to selective allow power from the inverter 5 to flow within the transmitting coils (smoothing capacitors are also shown in each circuit), thereby selecting which of the transmitting coils are used to transfer power to a coupled receiver. Each Hall-Effect switch is used to control the operation of an associated power switch S. The power switches may be, for example, transistors, such as bipolar junction transistors (BJT), field effect transistors (FETs), etc., and any variations thereof. In such examples, the Hall-Effect switches are connected to the control terminal of the respective power switch transistor, e.g., to the gate of the FET.

By default, the Hall-Effect switches 302 and 304 are normally open, accordingly the power switches S are open and the inverter 5 does not supply any power to the transmitting coils 306 and 308. When a switch 302 or 304 is activated by a receiver tag of a proximate receiver, that switch closes, thereby closing the associated power switch S and allowing current from the inverter 5 to flow to the corresponding transmitting coil 306 or 308. This circuit design may reduce the need for communication or control circuitry to supply power to the appropriate transmitting coil. In the illustrated example, the inverter 5 is depicted in a half-bridge configuration, however one of ordinary skill in the art understands that a full-bridge, configuration is also applicable. Further, in the illustrated example, the magnetic switches of the OD system are not directly connected to the transmitting coils, as typical magnetic switches are unable to cope with the relatively high current from the inverter. Accordingly, the power switches, which are rated for such high current, are used and the magnetic switches are able to control the power switches with relatively low current. Depending on application however, if the power levels being transferred by the wireless power system are relatively low, the power switches could be omitted and the magnetic switches used to directly connect the transmitting coils.

Figure 4:
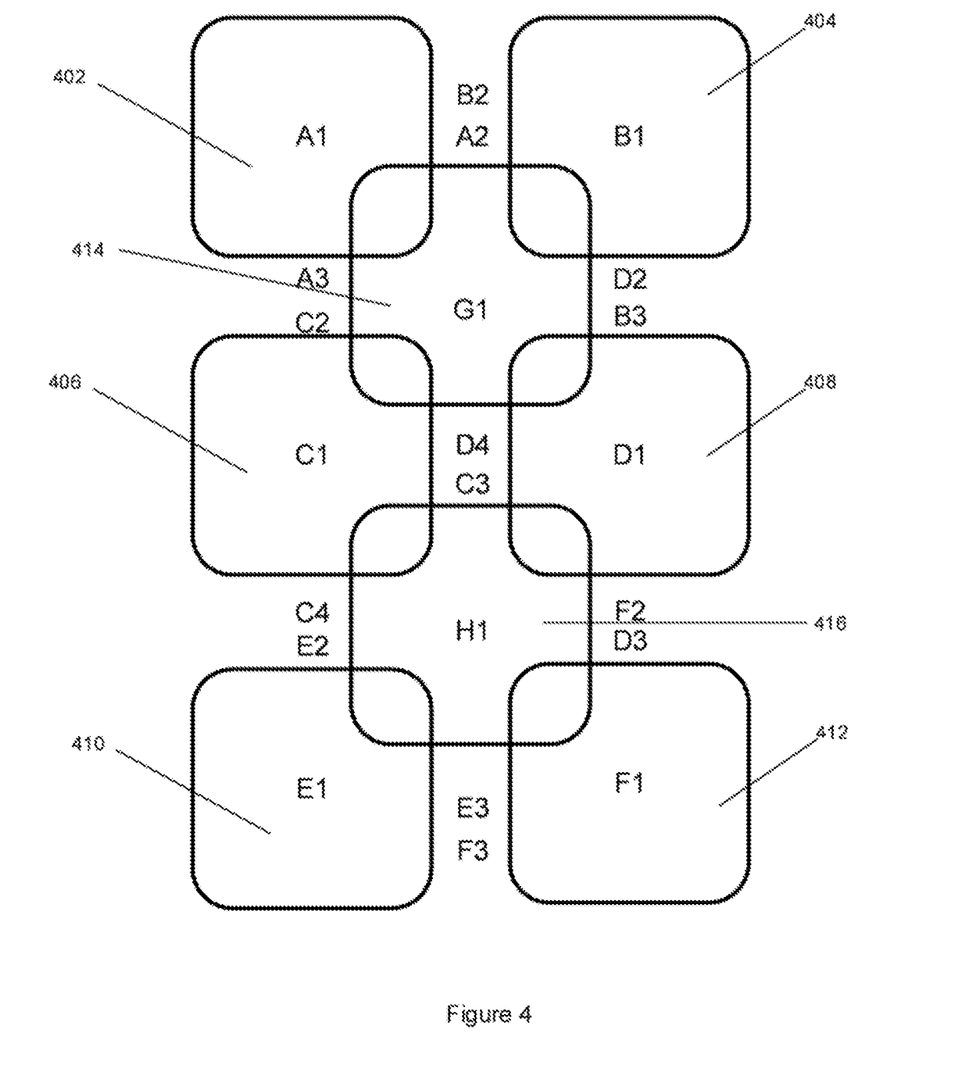
FIG. 4 is a schematic diagram of an array of transmitting coils.

An example of an array of transmitting coils is shown in FIG. 4. Each transmitting or IPT coil 402, 404, 406, 408, 410, 412, 414 and 416 may include a number of systematically arranged IPT ferrite elements (not shown) within the coils to enhance/shape the magnetic field induced by the AC signal from the one or more inverters of the transmitter. The IPT coils 402-416 may be arranged in a rectangular array structure and may be linear (2D), overlapping (as in FIG. 4) or 3 dimensionally (3D) arranged.

The IPT coils 402-416 are interleaved with magnetic switches (A1-H1) in an example configuration. In the example overlapped transmitter coil arrangement of FIG. 4, each transmitting coil 402-412 in the 'lower' layer (i.e., the coils 402-412 are overlapped by the coils 414 and 416 in the 'upper' layer) is associated with a number or group of magnetic-switches, arranged at the centre of and on each side of the transmitting coil 502, whereas the transmitting coils 414 and 414 in the 'upper' layer are each associated with a magnetic-switch. In this description the terms 'lower' and 'upper' are used relative to the interface surface of the charging mat of the power transmitter in which power receivers may be placed to be charged/powered, where "upper" is closer to the interface surface than "lower".

Further, as the coils 406 and 408 are between the coils 402 and 410 and 404 and 412, respectively, these 'inner' coils 406 and 408 are each associated with a larger group of magnetic switches than the 'outer' coils 402, 402, 410 and 412. Accordingly, as illustrated in FIG. 4, in the lower layer, the coil 402 is associated with three magnetic switches A1-A3, the coil 404 is associated with three magnetic switches B1-B3, the coil 406 is associated with four magnetic-switches C1-C4, the coil 408 is associated with four magnetic switches D1-D4, the coil 410 is associated with three magnetic switches E1-E3, and the coil 412 is associated with three magnetic switches F1-F3, and in the upper layer, the coil 414 is associated with one magnetic-switch G1, and the coil 416 is associated with one magnetic switch H1. This arrangement ensures reasonably fine detection by the OD system whilst maximising the number of transmitting coils that can be powered to provide an expanded area over which the IPT field can be generated by the transmitting coils to power the receiving coil(s) when a receiver is in the proximity of the transmitting coil(s).

In particular, in the arrangement of the transmitting coil 402 and the associated three magnetic switches A1, A2 and A3, magnetic switch A1 is within (illustrated as substantially at the centre of) the coil 402, magnetic switch A2 is on a first 'inner' side (illustrated as the right side in FIG. 4) of the coil 402 with respect to the adjacent coil 404, and magnetic switch A3 is on a second 'inner' side (illustrated as the bottom side in FIG. 4) of the coil 402 with respect to the adjacent coil 406. Similar arrangements are used for the other outer coils 404, 410 and 412 and associated magnetic switches B1-B3, E1-E3 and F1-F3, such that the magnetic switches are either within the associated transmitter coil or between that coil and the adjacent coil of the array (or coils within a larger array). With this configuration, a receiver object including a receiver tag may activate the transmitting coil 402 if it is placed in the vicinity of any of the associated magnetic switches.

A receiver (which includes a receiver tag) placed between the coils 402 and 404 may activate both of the magnetic switches A2 (associated with coil 402) and B2 (associated with coil 404). In this case, the receiver coil may be coupled to both of the transmitting coils 402 and 404. Such coupling can be used by the controller of the transmitter to decide whether one or both of the coils are energised to enact power transfer (e.g., using more than one transmitter coil can increase the amount of power transferred meeting power requirements of the receiver and/or speeding up charging of a rechargeable load of the power receiver).

Further, in the arrangement of the transmitting coil 406 and the associated four magnetic switches, C1, C2, C3 and C4, magnetic switch C1 is within (illustrated as located substantially at the centre of) the coil 406, magnetic switch C2 is on a first 'inner' side (illustrated as the upper side in FIG. 4) of the coil 406, magnetic switch C3 is on a second 'inner' side (illustrated as the right side in FIG. 4) of the coil 406, and magnetic switch C4 is on a third 'inner' side (illustrated as the lower side in FIG. 4) of the coil 406. A similar arrangement is used for the other inner coils 408 and associated magnetic switches D1-B4, such that the magnetic switches are either within the associated transmitter coil or between that coil and the adjacent coils of the array. A receiver including a receiver tag placed on the charging pad above any of these magnetic switches will activate the transmitting coil 406.

Any number of transmitting coils may be associated with any suitable number of magnetic switches, in any suitable configuration.

Figure 5:
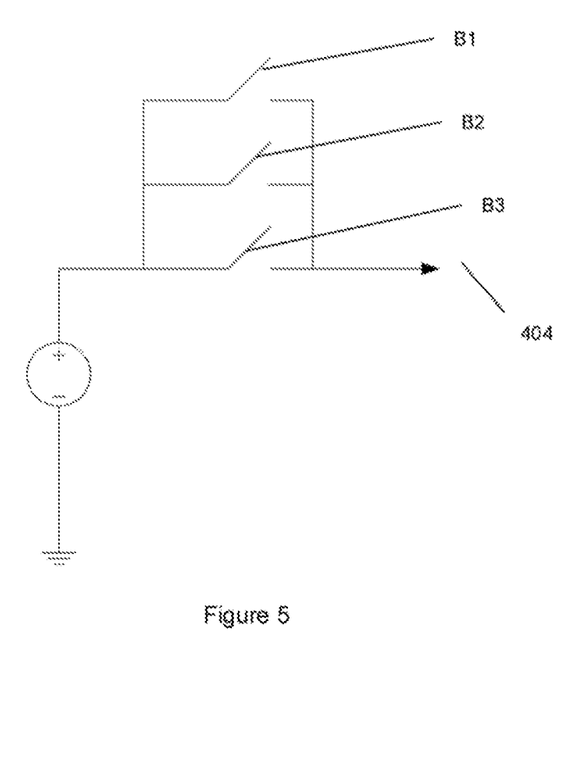
FIG. 5 is a circuit diagram of an object detection system of a transmitting coil of FIG. 4.

FIG. 5 shows an example circuit diagram for transmitting coil 404 (similar arrangements apply with respect to the other outer coils and like arrangements apply with respect to the inner coils). The three Hall-Effect switches B1-B3 are arranged in parallel, and are connected in series between the transmitting coil 404 and the inverter. If one or more of the switches B1-B3 are activated (by the proximity of a suitable permanent or activated non-permanent magnet), the inverter energises the transmitting coil 404.

Alternatively 3D type hall effect devices may be used to approximately determine the location of a receiver relative to an array of transmitter coils, and energise the most appropriate combination of transmitter coils to couple to the receiver. Such devices may be used to reduce the number of switches shown in FIG. 4, for a similar level of location sensitivity.

In a further alternative shown in FIGS. 8(a)-(e), each receiver could be provided with multiple tags or permanent magnets. In this case only one sensor (magnetic switch) is provided in the centre of each Tx coil. To enable detection at different Rx locations, several permanent magnets are distributed over the Rx instead. In this way the sensor can be activated either by the central magnet or the side magnets when it not positioned centre-to-centre with the Tx coil. This approach may have the advantage of reducing the number of required sensors, the number of required Tx coils or layers of Tx coils, complexity and cost.

Figure 8A:
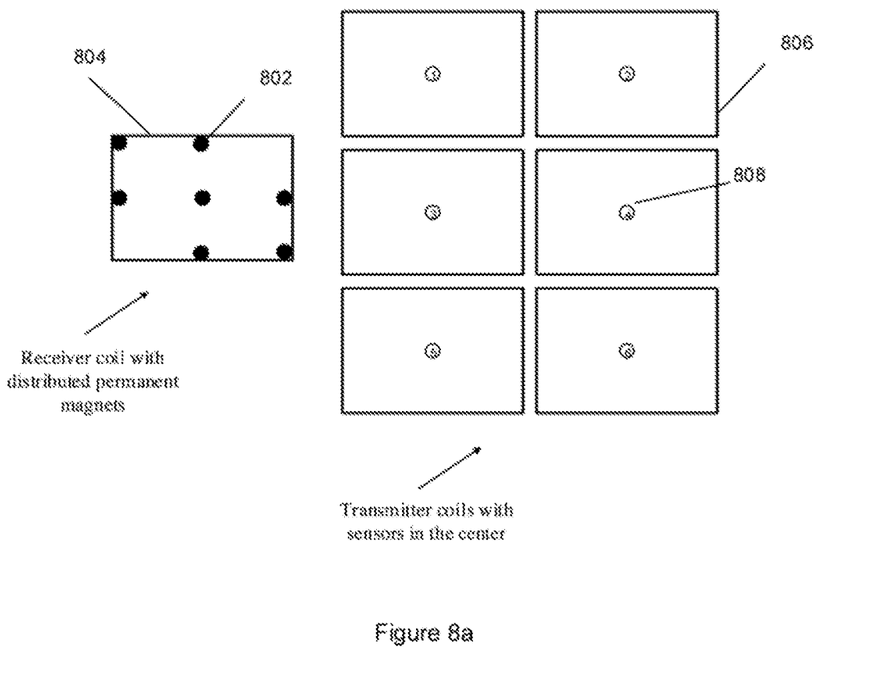
FIGS. 8a-e are schematic diagrams of an alternative receiver configuration.
Figure 8B:
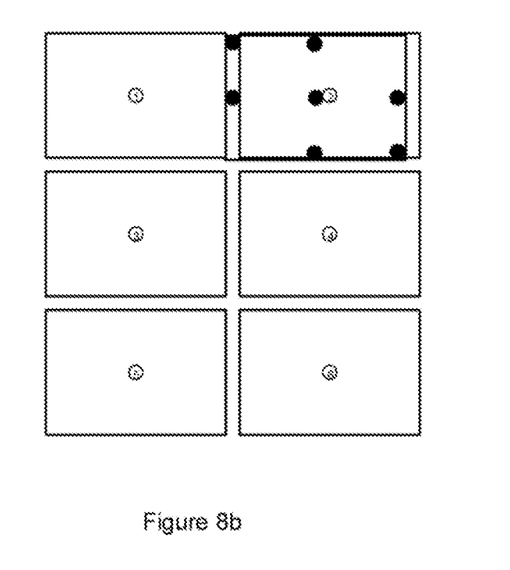
Figure 8C:
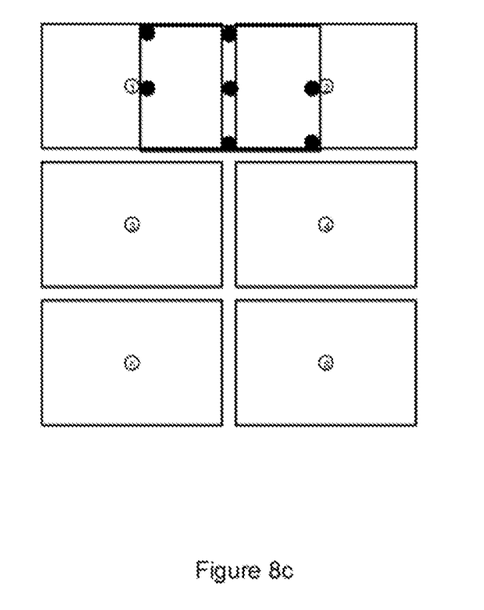
Figure 8D:
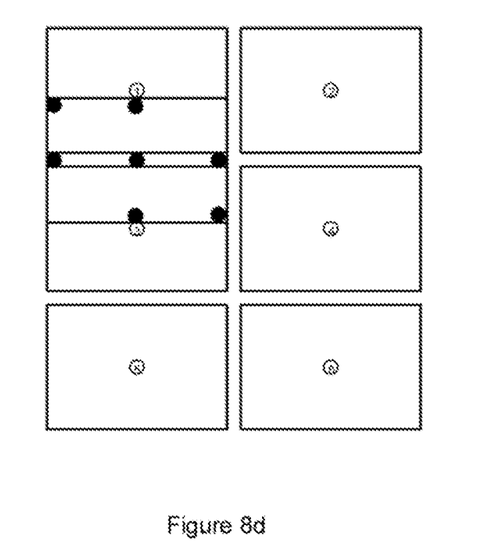
Figure 8E:
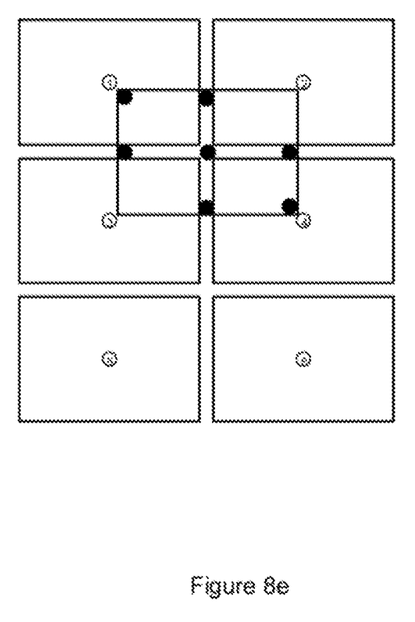

For example the receiver is shown in FIG. 8a with 7 magnets 802 distributed across its charging surface, within the receiver coil 804. The transmitter is configured with 6 coils 806 in a rectangular array, each with a permanent magnet 808 in the respective centre. In the Rx location in FIG. 8a no coils would be activated. In FIG. 8b only coil 2 would be activated. In FIG. 8c coils 1 and 2 would be activated. In FIG. 8d coils 1 and 3 would be activated. In FIG. 8e coils 1 and 4 would be activated. In a further alternative, a ribbon of magnetic material can be placed around the lower surface of the Rx.

The IPT system may avoid unnecessary powering of the transmitter, since by default the transmitter remains off as a standby power source when there is no load present. Where the transmitter has an array of transmitting coils, only the transmitting coil or coils of the array positioned relative the detected receiver device is or are powered on, thereby minimising wasted power and or exposure of users or other objects to magnetic fields. Further, activation of the transmitting coils due to the presence of foreign objects (including metals) on or near the charging pad may be obviated. Further, receivers receiving power from the transmitter may still receive that power even if foreign or other objects are placed on other parts of the transmitter interface surface. These factors may increase the life-span of the IPT system relative to conventional OD systems.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An inductive power transmitter comprising:
   a power transmitting coil configured to generate an inductive power transfer (IPT) field; and
   an object detection system configured to detect objects in or adjacent a space occupied by the IPT field when generated;
   wherein the object detection system is configured to:
      detect a potential receiver object by correlating a shape of a voltage versus time waveform or a current versus time waveform with a reference waveform shape, wherein the voltage versus time or current versus time waveform is magnetically induced by the potential receiver object;
      energize the power transmitting coil and attempt to communicate with the potential receiver object in response to detecting the potential receiver object; and
      de-energize the power transmitting coil in response to a failure in the attempt to communicate with the potential receiver object.

2. The transmitter in claim 1, wherein the object detection system comprises at least one magnetic switch.

3. The transmitter in claim 2, wherein the at least one magnetic switch comprises a component selected from the group consisting of: a Hall Effect switch, a Reed switch, and a 3D hall effect sensor.

4. The transmitter in claim 1, comprising a plurality of power transmitting coils, wherein the object detection system is located about each power transmitting coil, and the transmitter is configured to energise the respective power transmitting coil based on activation of the respective object detector through interaction with the potential receiver object.

5. The transmitter in claim 4, wherein a plurality of object detectors are located between respective power transmitting coils, and the transmitter is configured to energise one or more of the power transmitting coils based on activation of the respective detectors through interaction with the potential receiver object.

6. The transmitter in claim 5, wherein all the object detectors for a respective power transmitting coil are connected in parallel.

7. The transmitter in claim 4, wherein the power transmitting coils are not energised unless a potential receiver object is detected by the object detectors associated therewith under control of a controller of the transmitter.

8. The transmitter in claim 1 wherein the object detection system is configured to detect an adjacent non receiver object simultaneously with a receiver object.

9. The transmitter of claim 1, wherein the object detection system is configured to determine whether a response of the object detection system to detecting an object has a correlation with a reference response which is less than a threshold.

10. An inductive power transmitter comprising:
    a power transmitting coil configured to generate an inductive power transfer (IPT) field; and
    an object detection system configured to detect objects in or adjacent a space occupied by the IPT field when generated;
    wherein the object detection system is configured to:
       detect a potential receiver object by correlating a shape of a voltage versus time waveform or a current versus time waveform with a reference waveform shape, wherein the voltage versus time or current versus time waveform is magnetically induced by the potential receiver object;
       energize the power transmitting coil and attempt to communicate with the receiver object in response to detecting the receiver object, and
       de-energize the power transmitting coil in response to a failure in the attempt to communicate with the receiver object.

* * * * *